(12) United States Patent
Gomadam et al.

(10) Patent No.: US 8,811,523 B1
(45) Date of Patent: *Aug. 19, 2014

(54) FEEDBACK AND USER SCHEDULING FOR MULTI-USER MULTIPLE INPUT MULTIPLE OUTPUT (MU-MIMO) SYSTEM

(71) Applicant: Marvell International Ltd., Hamilton (BM)

(72) Inventors: Krishna Srikanth Gomadam, San Jose, CA (US); Daniel Yellin, Ra'anana (IL); Yu-Ngok Li, Oakland, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,284

(22) Filed: Dec. 16, 2013

Related U.S. Application Data

(63) Continuation of application No. 12/713,064, filed on Feb. 25, 2010, now Pat. No. 8,611,447.

(60) Provisional application No. 61/156,135, filed on Feb. 27, 2009.

(51) Int. Cl.
*H04B 7/02* (2006.01)

(52) U.S. Cl.
USPC ........... 375/267; 375/260; 375/299; 375/347; 375/349; 375/348

(58) Field of Classification Search
USPC ................. 375/267, 260, 299, 347, 349, 348
See application file for complete search history.

(56) References Cited

U.S. PATENT DOCUMENTS

| | | |
|---|---|---|
| 2006/0209980 A1 * | 9/2006 | Kim et al. ................... 375/267 |
| 2007/0165738 A1 | 7/2007 | Barriac et al. |
| 2009/0046569 A1 | 2/2009 | Chen et al. |
| 2009/0129259 A1 | 5/2009 | Malladi et al. |

OTHER PUBLICATIONS

IEEE Std 802.16-2004, "IEEE Standard for Local and metropolitan area networks, Part 16: Air Interface for Fixed Broadband Wireless Access Systems", IEEE Comoputer Society & IEEE Microwave Theory and Techniques Society, Oct. 1, 2004, pp. 1-857 (893 pages total).

* cited by examiner

*Primary Examiner* — Kabir A Timory

(57) ABSTRACT

Some of the embodiments of the present disclosure provide a method comprising selecting, by a user equipment (UE), a preferred interference precoding matrix from a plurality of candidate precoding matrices included in a codebook; and transmitting, by the user equipment to a communication node, a preferred interference precoding matrix index (PMI) corresponding to the preferred interference precoding matrix included in the codebook. Other embodiments are also described and claimed.

20 Claims, 6 Drawing Sheets

FEEDBACK AND USER SCHEDULING FOR MULTI-USER MULTIPLE INPUT MULTIPLE OUTPUT (MU-MIMO) SYSTEM

CROSS REFERENCE TO RELATED APPLICATIONS

The present disclosure is a continuation of and claims priority to U.S. patent application Ser. No. 12/713,064, filed Feb. 25, 2010, now U.S. Pat. No. 8,611,447, issued Dec. 17, 2013, which claims priority to U.S. Provisional Patent Application No. 61/156,135, filed Feb. 27, 2009, which are incorporated herein by reference.

TECHNICAL FIELD

This disclosure relates to multi-user multiple input multiple output (MU-MIMO) systems, and more specifically, to feedback and user scheduling in MU-MIMO systems.

BACKGROUND

Unless otherwise indicated herein, the approaches described in this section are not prior art to the claims in this disclosure and are not admitted to be prior art by inclusion in this section.

In a downlink multi-user multiple input multiple output (MU-MIMO) system, a communication node (e.g., a base station) serves one or more user equipments (e.g., other communication nodes, mobile stations, and/or the like) simultaneously through appropriate spatial multiplexing. Thus, in a MU-MIMO system, the base station simultaneously transmits communication signals to one or more user equipments (UEs).

FIG. 1 schematically illustrates a communication system 100. The communication system 100, which is a MU-MIMO communication system, includes a communication node 104 that wirelessly communicates with a plurality of UEs 120, 130, 140 and 160.

The communication node 104 includes a plurality of transmit antennas 106a, ..., 106d, and a plurality of receive antennas 108a and 108b. The UE 120 includes a plurality of receive antennas 126a and 126b and a transmit antenna 128a. Similarly, the UE 130 includes a plurality of receive antennas 136a and 136b and a transmit antenna 138a, the UE 140 includes a plurality of receive antennas 146a and 146b and a transmit antenna 148a, and the UE 160 includes a plurality of receive antennas 166a and 166b and a transmit antenna 168a.

Prior to transmitting data signals, the communication node 104 usually transmits pilot or control signals to the UEs 120, ..., 160 through one or more of the plurality of transmit antennas 106a, ..., 106d. Based at least in part on signals (e.g., pilot signals) received from the communication node 104, each individual UE 120, 130, 140, and/or 160 estimates a condition of the wireless channels between the communication node 104 and the UE. For example, UE 120 estimates a channel matrix $H_{120}$, which is representative of quality of a wireless communication channel between the communication node 104 and the UE 120. Similarly, UEs 130, 140 and 160 estimate respective channel matrices $H_{130}$, $H_{140}$, and $H_{160}$ that are representative of quality of respective wireless communication channels.

In the communication system 100, the communication node 104 and/or one or more of the UEs 120, ..., 160 generally store a common codebook C. Thus, the codebook C is a shared codebook, which is shared between the communication node 104 and/or one or more of the UEs 120, ..., 160. The codebook C includes a plurality of candidate precoding matrices $c_1, ..., c_N$. That is, $C=\{c_1, ..., c_N\}$.

Based at least in part on the respective estimated channel matrices $H_{120}, ..., H_{160}$, each of the UEs 120, ..., 160 select a respective precoding matrix from the plurality of candidate precoding matrices stored in the codebook C. For example, UE 120 may select precoding matrix $c_2$, UE 130 may select precoding matrix $c_4$, and so on.

Selection of the precoding matrix at an UE is based at least in part on the associated estimated channel matrix. For example, a precoding matrix $u_1$ is selected at UE 120 such that:

$$u_1 = \underset{c_j \in C}{\arg\max} \|(H_{120})(c_j)\|^2. \qquad \text{Equation (1)}$$

As discussed herein later with respect to Equation 4, in a case where $c_j$ is the selected precoding matrix, then $(H_{120})(c_j)$ is representative of a signal power component in the data signal received by the UE 120 from the communication node 104. Thus, in Equation 1, out of the N number of candidate precoding matrices $c_1, ..., c_N$ included in the codebook C, the selected precoding matrix $u_1$ at UE 120 is a precoding matrix that is associated with a relatively high (e.g., maximum) signal power component in data signal received by the UE 120 from the communication node 104.

Similarly, UE 130, UE 140 and UE 160 select precoding matrices $u_2$, $u_3$ and $u_4$, respectively, from the codebook C based at least in part on respective channel matrices $H_{130}$, $H_{140}$, and $H_{160}$. For example, as previously discussed, UE 120 may select precoding matrix $c_2$ (i.e., $u_2=c_2$), UE 130 may select precoding matrix $c_4$ (i.e., $u_3=c_4$), and so on.

Each of the UEs 120, ..., 160 then transmits an index of the respective selected precoding matrix to the communication node 104. This index is also referred to as precoding matrix index (PMI), as this index is representative of the associated selected precoding matrix. That is, each of the UEs 120, ..., 160 feeds back respective PM's to the communication node 104. For example, if UE 120 selects precoding matrix $c_2$ (i.e., if $u_1=c_2$), then UE 120 feeds back (e.g., through transmit antenna 128a) the PMI corresponding to precoding matrix $c_2$.

The communication node 104 receives (e.g., through one or more of the receive antennas 108a and 108b) the selected PM's from each of the UEs 120, ..., 140, and looks up the associated precoding matrices from common codebook C (stored in the communication node 104) using PM's received from the UEs 120, ..., 160. The communication node 104 utilizes the looked up precoding matrices for beamforming, while transmitting subsequent signals to the UEs.

As the communication system 100 is a MU-MIMO system, the communication node 104 may serve more than one UE simultaneously through spatial multiplexing. In an example, the communication node 104 transmits signal to UE 120 and UE 130 simultaneously through spatial multiplexing. This may be the case when, for example, the selected precoding matrices $u_1$ and $u_2$ of UE 120 and 130, respectively, are orthogonal to each other. In such a case, signal transmitted by the communication node 104 to the UEs 120 and 130 is given by:

$$x=(u_1)(x_1)+(u_2)(x_2), \qquad \text{Equation (2),}$$

where $x_1$ and $x_2$ are modulated symbols intended for UEs 120 and 130, respectively, and $u_1$ and $u_2$ are the precoding matrices for UE 120 and UE 130, respectively.

The signal received by, for example, UE 120 (e.g., by the receive antennas 126a and 126b of UE 120) is given by:

$$y_{120} = (H_{120})x + n,  \quad \text{Equation (3)},$$

where n is the white noise at the receive antennas 126a and/or 126b of UE 120, and x is the signal transmitted by the communication node 104 (e.g., see Equation 2). The signal $y_{120}$ received by UE 120 may be further simplified as:

$$y_{120} = (H_{120})(u_1)(x_1) + \underbrace{(H_{120})(u_2)}_{\text{unknown interference direction}}(x_2) + n, \quad \text{Equation (4)}$$

Symbol $x_1$ is intended for UE 120 and symbols $x_2$ is intended for UE 130. Accordingly, the term $(H_{120})(u_1)(x_1)$ is the signal component in the data signal received by the UE 120, and the term $(H_{120})(u_2)(x_2)$ is the interference component in the data signal received by the UE 120.

The UE 120 had earlier selected the precoding matrix $u_1$ and transmitted the PMI associated with precoding matrix $u_1$ to the communication node 104. Accordingly, the UE 120 knows the precoding matrix $u_1$ (e.g., has the precoding matrix $u_1$ stored in the UE 120), and hence, the term $((H_{120})(u_1))$ is known to the UE 120. That is, a signal direction (associated with $(H_{120})(u_1)$) of data signal $y_{120}$ is known to UE 120.

However, the UE 120 is not aware of the precoding matrix $u_2$ (or the PMI associated with the precoding matrix $u_2$), as the PMI associated with the precoding matrix $u_2$ was transmitted by UE 130 (but not by UE 120) to the communication node 104. Accordingly, an interference direction (associated with $(H_{120})(u_2)$) of the data signal $y_{120}$ is unknown to the UE 120.

For purposes of this disclosure and unless otherwise mentioned, a precoding matrix and an associated PMI corresponding to a signal direction of a UE are referred to herein as "signal precoding matrix" and "signal PMI," respectively, for the UE. For example, the precoding matrix $u_1$ is associated with signal direction for the UE 120. Accordingly, for the UE 120, the precoding matrix $u_1$ is referred to herein as signal precoding matrix, and the associated PMI is referred to herein as signal PMI.

For purposes of this disclosure and unless otherwise mentioned, a precoding matrix and an associated PMI corresponding to an interference direction of a UE are referred to herein as "interference precoding matrix" and "interference PMI," respectively, for the UE. For example, the precoding matrix $u_2$ is associated with interference direction for the UE 120. Accordingly, for the UE 120, the precoding matrix $u_2$ is referred to herein as interference precoding matrix, and the associated PMI is referred to herein as interference PMI. Also, the interference precoding matrix of one UE is the signal precoding matrix of another UE. For example, the interference precoding matrix $u_2$ of UE 120 is the signal precoding matrix of UE 130.

Referring again to Equation 4, the UE 120 knows the respective signal precoding matrix, the signal PMI, and the signal direction of data signal received by the UE 120. However, the UE 120 is unaware of UE 120's interference precoding matrix, interference PMI, and the interference direction.

As the interference direction is unknown to UE 120, the UE 120 in the conventional communication system 100 of FIG. 1 ignores the interference and performs, for example, maximal ratio combining (MRC) for data detection. However, in a MU-MIMO system, without knowing the interference, modulation coding scheme (MCS) selection in the UEs may not be accurate, which may result in a mismatch in estimated capacity at the UEs and communication node 104. Also, the UEs may not be able to manage interference effectively, which may lead to intra-cell interference. Not knowing the interference direction in a MU-MIMO communication system may also result in an interference limited communication system.

SUMMARY

In various embodiments, the present disclosure provides a method within a wireless communication network, the method comprising selecting, by a user equipment (UE), a preferred interference precoding matrix from a plurality of candidate precoding matrices included in a codebook; and transmitting, by the user equipment to a communication node, a preferred interference precoding matrix index (PMI) corresponding to the preferred interference precoding matrix included in the codebook.

In various embodiments, there is also provided a method within a wireless communication network, the method comprising receiving, by a communication node, a plurality of preferred interference PM's from a corresponding plurality of UEs, wherein each of the plurality of preferred interference PM's corresponds to a respective preferred interference precoding matrix of a plurality of preferred interference precoding matrices; determining, by the communication node, that a first interference direction corresponding to a first preferred interference PMI of the plurality of preferred interference PM's is orthogonal to a second interference direction corresponding to a second preferred interference PMI of the plurality of preferred interference PMIs, wherein the first preferred interference PMI is received from a first UE of the plurality of UEs, and the second preferred interference PMI is received from a second UE of the plurality of UEs; and pairing, by the communication node, the first UE with the second UE to form a first UE pair, wherein said pairing the first UE with the second UE is based at least in part on determining that the first interference direction is orthogonal to the second interference direction.

In various embodiments, there is also provided a mobile station comprising a preferred interference precoding matrix index (PMI) selection unit configured to select a preferred interference precoding matrix from a plurality of candidate precoding matrices included in a codebook; and one or more transmit antennas configured to transmit, to a base station, a preferred interference PMI corresponding to the preferred interference precoding matrix included in the codebook.

BRIEF DESCRIPTION OF THE DRAWINGS

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Embodiments of the present disclosure may be used in wireless access networks that employ orthogonal frequency division multiple access (OFDMA) communications as used by multicarrier transmission schemes presented in, e.g., the Institute of Electrical and Electronics Engineers (IEEE) 802.16—2009, approved May 13, 2009, along with any amendments, updates, and/or revisions (e.g., 802.16m, which is presently at predraft stage), 3rd Generation Partnership Project (3GPP) long-term evolution (LTE) project, ultra mobile broadband (UMB) project (also referred to as "3GPP2"), wireless access networks that employ multi-cell environment (e.g., wireless networks that employ a Coordinated Multi-Point transmission/reception (CoMP) feature in LTE-Advanced downlink/uplink (DL/UL) MIMO systems (also referred as LTE-A)), and/or the like. In other embodiments, communications may be compatible with additional/alternative communication standards and/or specifications.

Figure 2:
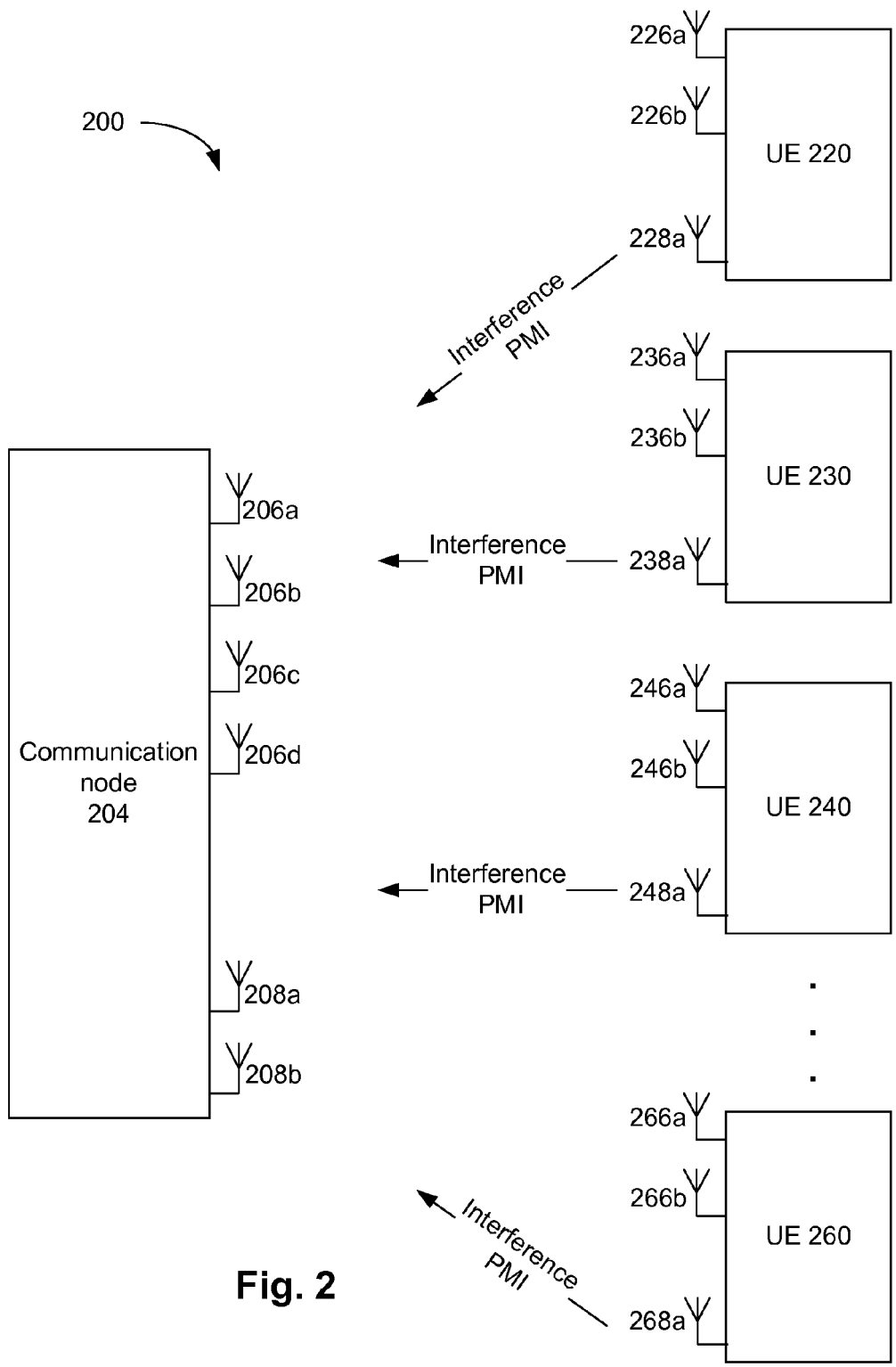
FIG. 2 schematically illustrates another communication system, in accordance with various embodiments of the present disclosure.

FIG. 2 schematically illustrates a communication system 200, in accordance with various embodiments of the present disclosure. In various embodiments, the communication system 200 is a MU-MIMO communication system. The communication system 200 includes a communication node 204 that wirelessly communicates with a plurality of UEs 220, 230, 240 and 260. In various embodiments, the communication node 204 is a base station, and one or more of the UEs 220, . . . , 260 are mobile stations communicating wirelessly with the communication node 204.

The communication system 200 is a closed-loop system that employs beamforming to increase a signal to noise ratio (SNR) of signals transmitted by the communication node 204 to the UEs 220, . . . , 260.

Although FIG. 2 illustrates one communication node 204 and four UEs 220, . . . , 260, the communication system 200 may include any other number of communication nodes and/or UEs.

As the communication system 200 is a MU-MIMO system, the communication node 204 may serve more than one UE simultaneously through spatial multiplexing. In the conventional system 100 of FIG. 1, the individual UEs feeds back signal PMIs to the communication node 104, based on which the communication node 104 schedules a plurality of UEs (e.g., UE 120 and 130) for simultaneous transmission. Thus, in the conventional system 100 of FIG. 1, the communication node 104 schedules one or more UEs for simultaneous transmission based at least in part on the signal PMIs received from respective UEs. In contrast, in the communication system 200 of FIG. 2, each UEs transmit a respective preferred interference PMI (instead of, for example, a signal PMI) to the communication node 204, based at least in part on which the communication node 204 schedules one or more UEs for simultaneous transmission, as will be discussed in more detail herein later.

Referring again to FIG. 2, the communication node 204 includes a plurality of transmit antennas $206a, \ldots, 206d$, and a plurality of receive antennas $208a$ and $208b$. The UE 220 includes a plurality of receive antennas $226a$ and $226b$ and a transmit antenna $228a$. Similarly, the UE 230 includes a plurality of receive antennas $236a$ and $236b$ and a transmit antenna $238a$, the UE 240 includes a plurality of receive antennas $246a$ and $246b$ and a transmit antenna $248a$, and the UE 260 includes a plurality of receive antennas $266a$ and $266b$ and a transmit antenna $268a$. Although FIG. 2 illustrates specific numbers of transmit and receive antennas of various components, in various other embodiments any other number of transmit antennas and receive antennas of the communication node 104, UE 120, UE 130, UE 140 and/or UE 160 may also be possible.

Figure 1:
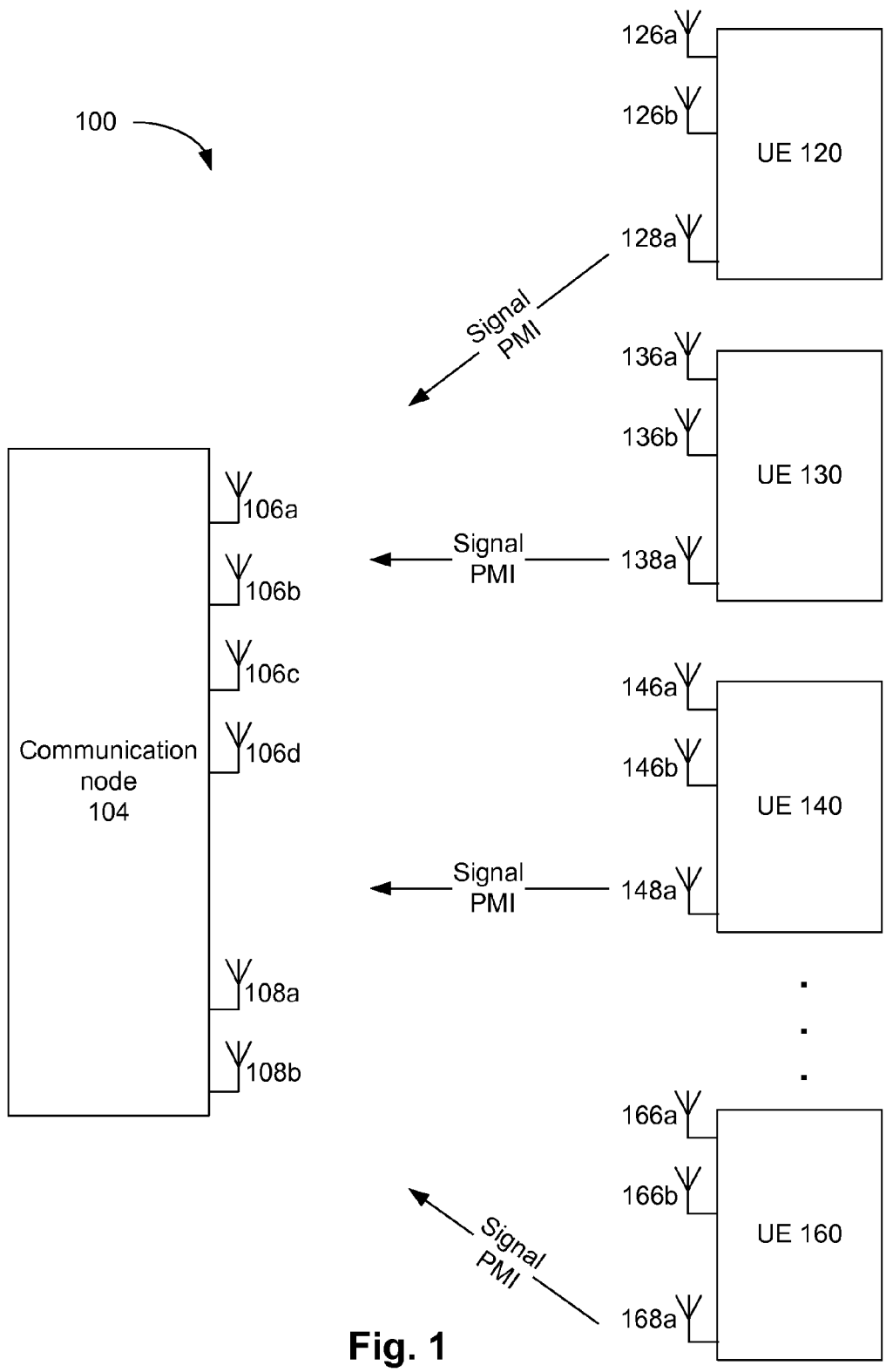
FIG. 1 schematically illustrates a communication system.

Similar to the communication system 100 of FIG. 1, prior to transmitting data signals, the communication node 204 of FIG. 2 transmits pilot or control signals to the UEs 220, . . . , 260 through one or more of the plurality of transmit antennas $206a, \ldots, 206d$. Based at least in part on signals (e.g., pilot signals) received from the communication node 204, individual UEs 220, 230, 240, and/or 260 estimate conditions of the wireless channel between the communication node 204 and the respective UEs. For example, UE 220 estimates a channel matrix $H_{220}$, which is representative of a quality of wireless communication channel between the communication node 204 and the UE 220. Similarly, UEs 230, 240 and 260 estimate respective channel matrices $H_{230}$, $H_{240}$, and $H_{260}$ that are representative of quality of respective wireless communication channels.

Similar to the communication system 100 of FIG. 1, the communication node 204 and/or one or more of the individual UEs of FIG. 2 store a common codebook C. The codebook C is a shared codebook, which is shared between the communication node 204 and/or one or more of the UEs of FIG. 2. The codebook C includes a plurality of candidate precoding matrices $c_1, \ldots, c_N$. That is, $C=\{c_1, \ldots, c_N\}$.

The dimension of the precoding matrices are based on, for example, a number of transmit antennas of the communication node 204 and a number of data streams transmitted by the communication node 204. For example, for $N_t$ number of transmit antennas of the communication node 204 (wherein $N_t$ is an integer, and is equal to four in FIG. 2) and $N_s$ number of data streams (wherein $N_s$ is an appropriate integer), the precoding matrices are of dimension $N_t$ by N. For a single data stream (i.e., $N_s=1$), each precoding matrix is a vector of dimension $N_t$.

Subsequent to determining the respective estimated channel matrices $_{H220}, \ldots, _{H260}$, each of the UEs 220, ..., 260 selects a respective preferred interference precoding matrix from the plurality of candidate precoding matrices stored in the codebook C. For example, UE 220 may select precoding matrix $_{c4}$ as its preferred interference precoding matrix, UE 230 may select precoding matrix $_{c2}$ as its preferred interference precoding matrix, and so on.

Selection of the preferred interference precoding matrix at an UE is based at least in part on the associated estimated channel matrix. For example, a preferred interference precoding matrix $w_1$ is selected at UE 220 such that:

$$w_1 = \underset{c_j \in C}{\arg\min} \|(H_{220})(c_j)\|^2. \quad \text{Equation (5)}$$

In various other embodiments, in some environments (e.g., where correlated channels are used), the preferred interference direction of an UE may be a null space of the channel.

As discussed herein later with respect to Equation 10, in the case where $c_j$ is the interference precoding matrix of UE 220, then $(H_{220})(c_j)$ is representative of interference power component in the data signal received by the UE 220 from the communication node 204. Thus, out of the N number of candidate precoding matrices $c_1, \ldots, c_N$ included in the codebook C, the selected preferred interference precoding matrix $w_1$ at UE 220 is a precoding matrix that is associated with a relatively low (e.g., minimum) interference power component in data signal received by the UE 220 from the communication node 204.

In various embodiments, the preferred interference precoding matrix $w_1$ of UE 220 is associated with a preferred direction for the interference signal for the UE 220. For example, in the case where the communication node 204 schedules UEs 220 and 230 for simultaneous transmission, the UE 220 may prefer that the communication node 204 transmits signals to the UE 230 in the direction associated with $w_1$. In such a case, in the signal received by the UE 220 from the communication node 204, the interference power component will be in the direction associated with $w_1$. Also, as discussed with respect to Equation 5, interference power received by the UE 220 in the direction associated with $w_1$ is relatively low (e.g., minimum among all the candidate precoding matrices). That is, the interference experienced by the UE 220 in the direction associated with the preferred interference precoding matrix $w_1$ will also be relatively low (e.g., minimum among all the candidate precoding matrices).

In various embodiments, similar to Equation 5, UE 230, UE 240 and UE 260 also select preferred interference precoding matrices $w_2$, $w_3$ and $w_4$, respectively, from the codebook C based at least in part on respective channel matrices $H_{230}$, $H_{240}$, and $H_{260}$.

Each of the UEs 220, ..., 260 then transmits an index of the preferred interference precoding matrix to the communication node 204. As previously discussed, this index is also referred to herein as interference PMI, as this index is representative of the associated interference precoding matrix. That is, each of the UEs 220, ..., 260 feeds back respective preferred interference PMIs to the communication node 204, as illustrated in FIG. 2. For example, if UE 220 selects precoding matrix $c_4$ (i.e., if $w_1=c_4$) as its preferred interference precoding matrix, then UE 220 feeds back (e.g., through transmit antenna 228a) the interference PMI corresponding to precoding matrix $c_4$.

For the MU-MIMO communication system 200, in the case where two UEs (e.g., UE 220 and UE 230) are scheduled for simultaneous transmission, the direction associated with signal PMIs of the two UEs is usually orthogonal. That is, during simultaneous transmission, the communication node 204 transmits signals to UE 220 in a signal direction that is orthogonal to the signal direction of signal transmitted to the UE 230. Accordingly, if UE 220 receives signal in a first direction and interference in the second direction (wherein the second direction is also the signal direction for UE 230), the first and second directions are orthogonal, which results is a relatively low interference.

As previously discussed with respect to Equation 5, the UE 220 selects a preferred interference PMI direction w1, which is the preferred direction for interference signal for UE 220. As previously discussed, the direction of signal PMI has to be orthogonal to the direction of the interference PMI direction w1. However, based on the dimensions of the precoding matrix, there may be one or more other directions that are orthogonal to the direction w1. For example, in the case where the communication node 204 has $N_t$ number of transmit antennas ($N_t=4$ for the communication system 200) and a single data stream (i.e., $N_s=1$), the interference precoding matrix has a dimension of $N_t$ by 1. Accordingly, there are $(N_t-1)$ number of directions that are orthogonal to the interference PMI direction $w_1$. The communication node 204 may chose to transmit signals to the UE 220 in one of these $(N_t-1)$ number of directions. However, although in this example scenario $N_s$ is assumed to be one, in various other embodiments, $N_s$ may have any appropriate higher integer value (e.g., as long as a number of receive antennas in individual UEs is equal to or greater than a total number of data streams $N_s$ transmitted from the communication node 204).

In various embodiments, for each of these $(N_t-1)$ directions, the UE 220 estimates an approximate SNR if signals are transmitted by the communication node 204 to the UE 220 in the respective signal direction, based at least in part on the channel matrix $H_{220}$. For example, in the case where $N_t=4$ (as in the communication system 200), there are three possible signal directions for the UE 220. For a first of these three directions, the UE 220 estimates, based at least in part on the channel matrix $H_{220}$, an SNR (e.g., taking into account the interference received in the direction $w_1$) if communication node 204 transmits signals to the UE 220 in the first of these three directions and transmits signals to another UE (e.g., UE 230) in the direction $w_1$. The UE 220 repeats this SNR calculation for the remaining two of these three directions as well. These three SNRs are indicative of the link quality in the respective three directions.

In various embodiments, in addition to feeding back the preferred interference PMI direction $w_1$, UE 220 also feedbacks the $(N_t-1)$ number of SNRs corresponding to the $(N_t-1)$ number of directions that are orthogonal to the interference PMI direction $w_1$.

Similarly, each of the UEs 230, 240 and 260 also transmits SNRs corresponding to the directions orthogonal to the of respective preferred interference PMI directions.

Once the communication node 204 receives, from each UE 220, ..., 260, the preferred interference PMI and the SNRs corresponding to directions that are orthogonal to the direction of preferred interference PMI, the communication node 204 pairs or schedules one or more UEs for simultaneous transmission. For example, for UE 220, the communication node 204 finds all UEs that have preferred interference PMI direction that are orthogonal to the preferred interference PMI direction $w_1$ of UE 220. In an example, interference PM's $w_2$ (associated with UE 230) and $w_4$ (associated with UE 260) are both orthogonal to interference PMI direction $w_1$ of UE 220. That is, directions $w_1$, $w_2$ and $w_4$ are all orthogonal to each other. Accordingly, the communication node 204 may pair UE 220 with either UE 230 or with UE 260. That is, two possible UE pairs may form for simultaneous transmission: (UE 220 and UE 230) or (UE 220 and UE 260).

For the first UE pair (i.e., UE 220 and UE 230), the signal directions of UEs 220 and 230 are $w_2$ (which is the preferred interference direction of UE 230) and $w_1$ (which is the preferred interference direction of UE 220), respectively. Accordingly, the communication node 204 computes a first scheduling metric M1 based at least in part on achievable SNRs of UEs 220 and 230 in the signal directions $w_2$ and $w_2$, respectively. In various embodiments, the first scheduling metric M1 is computed as:

$$M1=\log(1+SNR(UE_{220}\_w_2))+\log(1+SNR(UE_{230}\_w_1)),\quad\text{Equation (6)},$$

where $SNR(UE_{220}\_w_2)$ is the SNR of the UE 220 in the signal direction $w_2$ (this SNR was fed back earlier by the UE 220 to the communication node 204), and $SNR(UE_{230}\_w_1)$ is the SNR of the UE 230 in the signal direction $w_1$ (this SNR was fed back earlier by the UE 230 to the communication node 204).

Similarly, for the second UE pair (i.e., UE 220 and UE 260), the signal directions of UEs 220 and 260 are $w_4$ (which is the preferred interference direction of UE 260) and $w_1$ (which is the preferred interference direction of UE 220), respectively. Accordingly, the communication node 204 computes a second scheduling metric M2 based at least in part on achievable SNRs of UEs 220 and 260 in the signal directions $w_4$ and $w_1$, respectively. In various embodiments, the second scheduling metric M2 is computed as:

$$M2=\log(1+SNR(UE_{220}\_w_4))+\log(1+SNR(UE_{260}\_w_1)),\quad\text{Equation (7)},$$

where $SNR(UE_{220}\_w_4)$ is the SNR of the UE 220 in the signal direction $w_4$ (this SNR was fed back earlier by the UE 220 to the communication node 204), and $SNR(UE_{260}\_w_1)$ is the SNR of the UE 260 in the signal direction $w_1$ (this SNR was fed back earlier by the UE 260 to the communication node 204).

In various embodiments, the communication node 204 selects one of the two UE pairs that have a relatively higher scheduling metric. For example, if M1>M2, the communication node 204 selects the first UE pair, and schedules UE 220 and 230 for simultaneous transmission. In such a case, the communication node 204 may schedule UE 260 for simultaneous transmission with another UE, or may transmit signals to UE 206 without transmitting simultaneously to any other UEs.

In various embodiments, the communication node 204 similarly calculates scheduling metrics for UE pairs involving other UEs (e.g., UEs 230, 240, and/or 260), and similarly pairs remaining UEs for possible simultaneous scheduling.

In various other embodiments, the communication node 204 may transmit signals simultaneously to UEs 220, 230 and 260. In various other embodiments, the communication node 204 may use any other appropriate scheduling technique, as will be understood by those skilled in the art based on the teachings of this disclosure.

Once the communication node 204 completes scheduling the UEs for simultaneous signal transmission, the communication node 204 transmits signals based on the completed scheduling. For example, in the case where the communication node 204 schedules UE 220 and UE 230 for simultaneous transmission, signal transmitted by the communication node 204 to the UEs 220 and 230 is given by:

$$x=(w_2)(x_1)+(w_1)(x_2),\quad\text{Equation (8)},$$

where $x_1$ and $x_2$ are modulated symbols intended for UEs 220 and 230, respectively.

The signal received by UE 220 (e.g., by the receive antennas 226a and 226b of UE 220) is given by:

$$y_{220}=(H_{220})x+n,\quad\text{Equation (9)},$$

where n is the white noise at the receive antennas 226a and/or 226b of UE 220, and x is the signal transmitted by the communication node 204 (e.g., see Equation 8). Equation 9 may be further simplified as:

$$y_{220} = (H_{220})(w_2)(x_1) + \underbrace{(H_{220})(w_1)}_{\substack{\text{known}\\\text{interference direction}}}(x_2) + n,\quad\text{Equation (10)}$$

The UE 220 had earlier selected the preferred interference precoding matrix $w_1$, and accordingly, the preferred interference direction $(H_{220})(w_1)$ is known to the UE 220 (e.g., stored in UE 220). In contrast, in the conventional communication system 100 of FIG. 1, the interference direction was unknown to UE 120, as illustrated in Equation 4.

Also, once the UE scheduling by the communication node 204 is complete, in various embodiments, the communication node 204 transmits, among other information, respective signal PMI and modulation and coding scheme (MCS) of the data signal to each of the UEs. For example, communication node 204 transmits, to the UE 220, the signal PMI (which, in the above example, is the PMI corresponding to $w_2$) and the MCS of the UE 220. In various embodiments, transmission of signal PMI and MCS to respective UEs may be performed, for example, before data signal transmission (i.e., before transmission of data signal $y_{220}$ according to Equations 9 and 10).

Thus, both the signal direction (i.e., $(H_{220})(w_2)$) and the interference direction (i.e., $(H_{220})(w_1)$) of UE 220 are known to the UE 220, during or before the UE 220 receives data signal $y_{220}$ from the communication node 204. In various embodiments, the UE 220 uses the known signal direction and the known interference direction to process and decode the received data signal $y_{220}$. With the known signal direction and interference direction, the optimal receiving at the UE 220 is, for example, minimum mean square error (MMSE). In various embodiments, the optimal receive combining is given by:

$$v=((H_{220})(w_2)(w_2)^*(H_{220})^*(P/2)+N_0I)^{-1}(H_{220})(w_1)\quad\text{Equation (11)}$$

where $(A)^*$ indicates Hermitian (i.e., complex conjugate and then transpose) of matrix A, and $(A)^{-1}$ indicates inverse of matrix A, where I is an identity matrix of appropriate dimension, (P/2) is an indication of signal power transmitted by the communication node 204, and $N_o$ is an estimated thermal white noise at the receiver.

In various embodiments, in the case where the communication node 204 does not transmit a signal PMI to the UE 220, the signal direction (i.e., $(H_{220})(w_2)$) may be unknown to the UE 220. However, the interference direction (i.e., $(H_{220})(w_1)$) will still be known to the UE 220, as the UE 220 fed back the interference PMI earlier to the communication node 204. In such a case, optimal receive combining at the UE 220 may be to choose a signal direction that is orthogonal to the interference direction $w_2$.

In various embodiments, UE 220 may determine if any other UEs (e.g., UE 230) have been scheduled to receive simultaneous transmission. Such a determination is performed by observing a power level of the received signals. For example, the power level of data signal transmission by the communication node 204, without simultaneous (i.e., co-scheduled) transmission, is supposed to be about P. In the case where the actual power level of the data signals received by UE 220 is less than P (e.g., is about P/2), then the UE 220 assumes presence co-scheduled UEs (i.e., presence of simultaneous transmission), and performs optimal receiving as per, for example, Equation 11. In the case where the actual power level of the data signals received by UE 220 is about P, then UE 220 assumes that no other UE is co-scheduled for simultaneous transmission. In such a case, UE 220 performs, for example, maximal ratio combining (MCR) by assuming absence of any interference.

Figure 3:
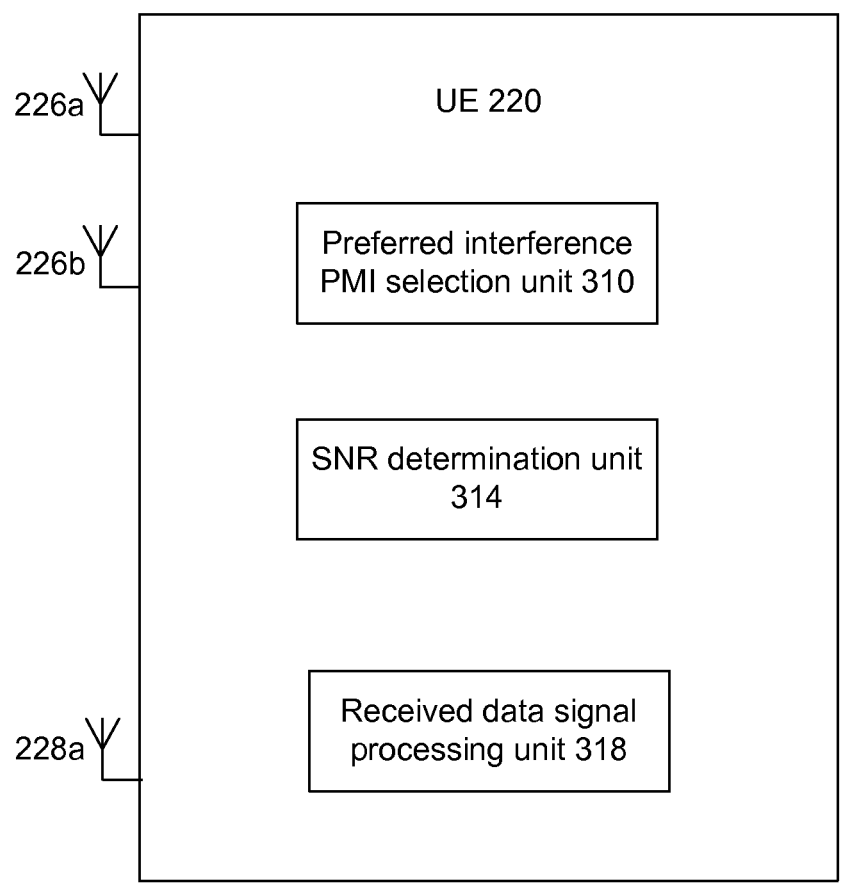
FIG. 3 schematically illustrates a UE of FIG. 2 in more detail, in accordance with various embodiments of the present disclosure.

FIG. 3 schematically illustrates the UE 220 of FIG. 2 in more detail, in accordance with various embodiments of the present disclosure. As previously discussed and as illustrated in FIGS. 2 and 3, the UE 220 includes a plurality of receive antennas 226a and 226b and a transmit antenna 228a. In addition, the UE 220 includes a preferred interference PMI selection unit 310, a SNR determination unit 314, and a received data signal processing unit 318. In various embodiments, one or more of these units may be combined to form a single unit, and/or one or more components of at least some of these units may be common or shared. Functionality of each of these units will be discussed in more detail with respect to FIG. 4 herein later.

Figure 4:
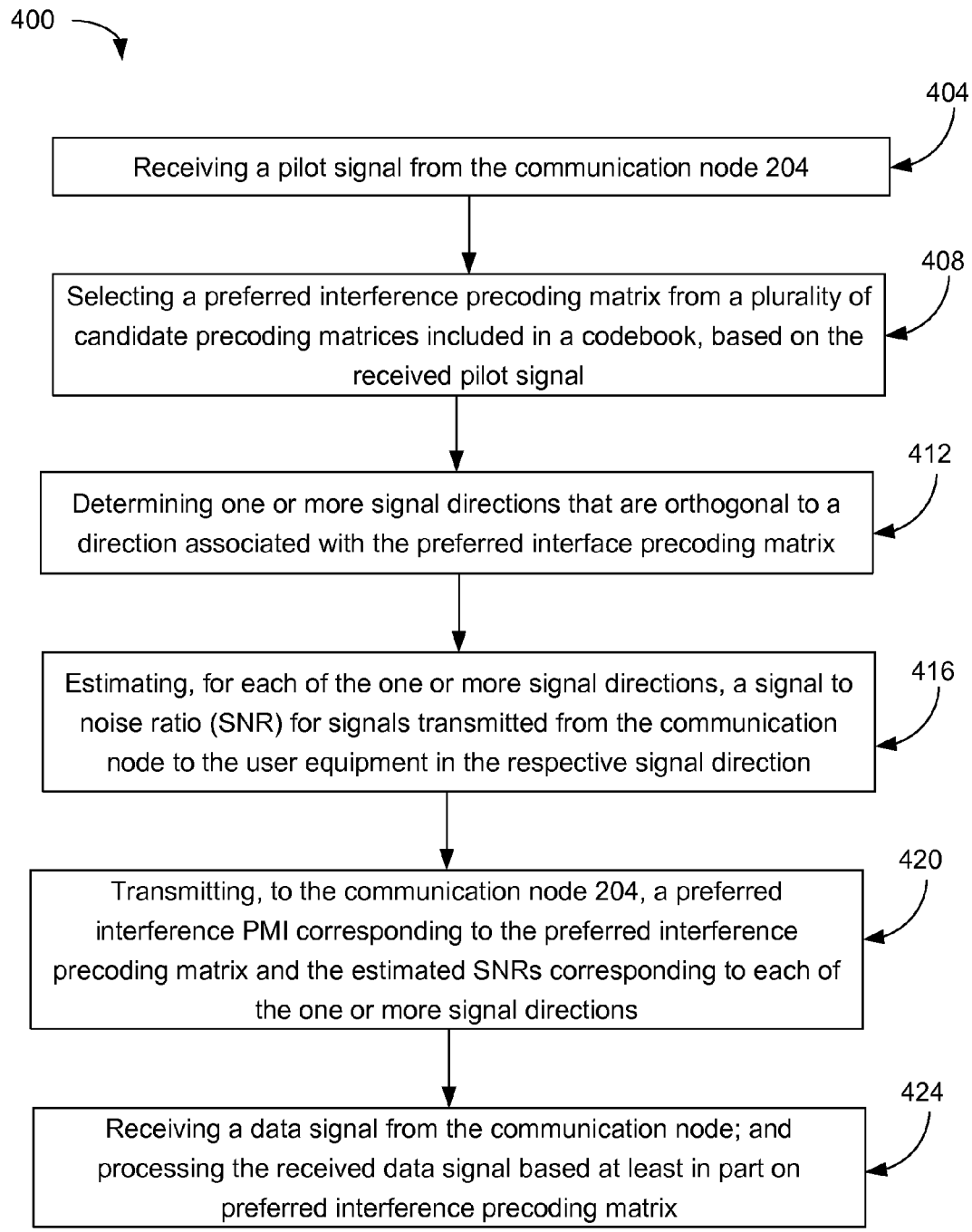
FIG. 4 illustrates a method for feeding back, by the UE of FIGS. 2 and 3, preferred interference PMI and SNRs to a communication node, in accordance with various embodiments of the present disclosure.

FIG. 4 illustrates a method 400 for feeding back, by the UE 220 of FIGS. 2 and 3, preferred interference PMI and SNRs to the communication node 204, in accordance with various embodiments of the present disclosure. Referring to FIGS. 2, 3 and 4, the method 400 includes, at 404, receiving (e.g., by the receive antennas 226a and 226b of the UE 220) pilot signal from the communication node 204.

At 408, the UE 220 (e.g., the preferred interference PMI selection unit 310) selects a preferred interference precoding matrix from a plurality of candidate precoding matrices included in the codebook C, based on the received pilot signal. For example, the UE 220 determines a channel matrix $H_{220}$ based on the received pilot signals. Furthermore, based on the channel matrix $H_{220}$, the UE 220 estimates a plurality of interference power components, such that each interference power component of the plurality of interference power components corresponds to a respective candidate precoding matrix of the plurality of candidate precoding matrices. For example, for a candidate precoding matrix $c_1$ in the codebook C, the interference power component is given by $\|(H_{220})(c_1)\|^2$, as discussed with respect to Equation 5. Furthermore, the UE 220 selects a first candidate precoding matrix as the preferred interference precoding matrix, where the first candidate precoding matrix, among the plurality of candidate precoding matrices, is associated with a relatively low (e.g., minimum) interference power component among the plurality of interference power components, as discussed with respect to Equation 5.

Referring again to FIG. 4, at 412, the UE 220 (e.g., the SNR determination unit 314) determines one or more signal directions that are orthogonal to a direction associated with the preferred interface precoding matrix. For example, as previously discussed as an example, if $w_1$ is the preferred interface precoding matrix of UE 220, $w_2$ and $w_4$ may be signal directions that are orthogonal to the direction $w_1$.

At 416, the UE 220 (e.g., the SNR determination unit 314) estimates, for each of the one or more signal directions, an SNR for signals transmitted from the communication node to the UE 220 in the respective signal direction, as previously discussed.

At 420, the UE 220 (e.g., the transmit antenna 228a of UE 220) transmits, to the communication node 204, a preferred interference PMI corresponding to the preferred interference precoding matrix and the estimated SNRs corresponding to each of the one or more signal directions.

At 424, the UE 220 (e.g., one or more of the receive antennas 226a and 226b) receives data signal (e.g., data signal $y_{220}$ of Equations 9 and/or 10) from the communication node 204. The UE 220 (e.g., the received data signal processing unit 318 of UE 220) processes the received data signal based at least in part on preferred interference precoding matrix, as discussed, for example, with respect to Equation 11.

Figure 5:
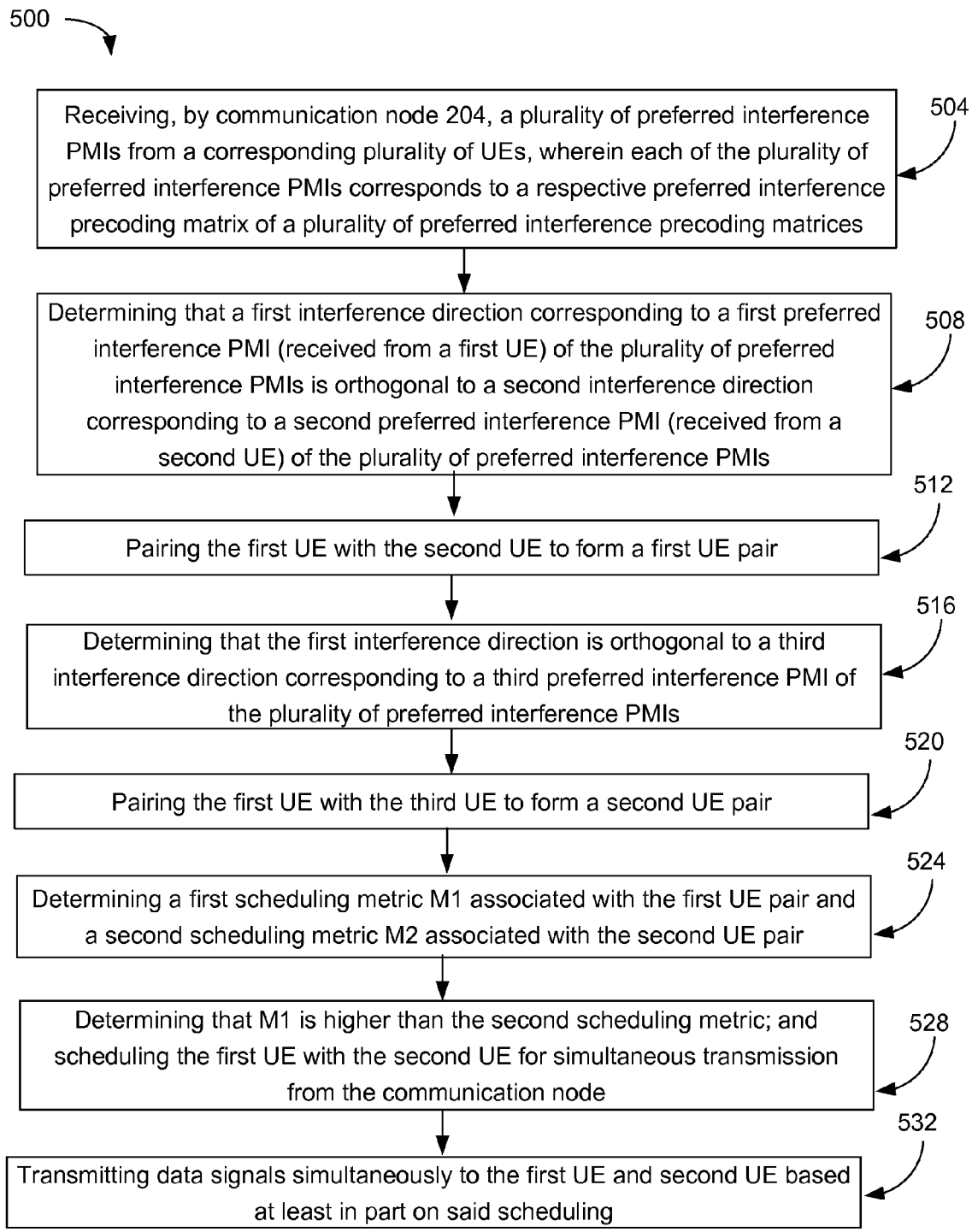
FIG. 5 illustrates a method for UE scheduling and data signal transmission by a communication node of FIG. 2, in accordance with various embodiments of the present disclosure.

FIG. 5 illustrates a method 500 for UE scheduling and data signal transmission by the communication node 204 of FIG. 2, in accordance with various embodiments of the present disclosure. Referring to FIGS. 2, and 5, the method 500 includes, at 504, receiving, by communication node 204, a plurality of preferred interference PM's from a corresponding plurality of UEs, wherein each of the plurality of preferred interference PM's corresponds to a respective preferred interference precoding matrix of a plurality of preferred interference precoding matrices. For example, the communication node 204 receives preferred interference PM's corresponding to preferred interference precoding matrices $w_1, \ldots, w_4$ from UEs 220, ..., 260, respectively.

At 508, the communication node 204 determines that a first interference direction corresponding to a first preferred interference PMI (e.g., preferred interference PMI corresponding to $w_1$, received from a first UE 220) of the plurality of preferred interference PM's is orthogonal to a second interference direction corresponding to a second preferred interference PMI (e.g., preferred interference PMI corresponding to $w_2$, received from a second UE 230) of the plurality of preferred interference PMIs.

At 512, the communication node 204 pairs the first UE 220 with the second UE 230 to form a first UE pair, based at least in part on determining that the first interference direction is orthogonal to the second interference direction.

At 516, the communication node 204 determines that the first interference direction is orthogonal to a third interference direction corresponding to a third preferred interference PMI (e.g., preferred interference PMI corresponding to w4, received from a third UE 260) of the plurality of preferred interference PM's.

At 520, the communication node 204 pairs the first UE 220 with the third UE 260 to form a second UE pair, where pairing the first UE 220 with the third UE 260 is based at least in part on determining that the first interference direction is orthogonal to the third interference direction.

At 524, the communication node 204 determines a first scheduling metric M1 associated with the first UE pair and a second scheduling metric M2 associated with the second UE pair using, for example, Equations 6 and 7.

At 528, the communication node 204 determines, for example, that the first scheduling metric M1 is higher than the second scheduling metric M2. Based on such determination, the communication node 204 selects the first UE pair, and schedules the first UE 220 with the second UE 230 for simultaneous transmission from the communication node 204.

At 532, the communication node 204 transmits data signals simultaneously to the first UE 220 and second UE 230, based at least in part on the scheduling at 528.

Figure 6:
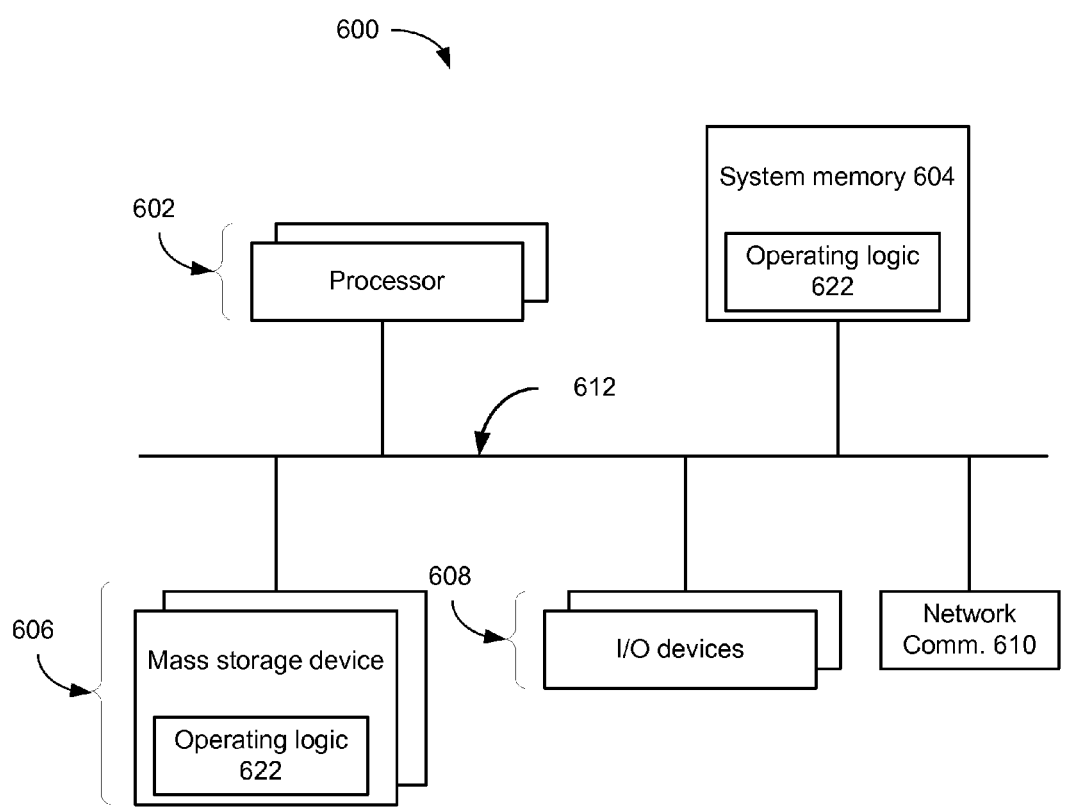
FIG. 6 is a block diagram of an illustrative system suitable for practicing the embodiments of the present disclosure.

FIG. 6 is a block diagram of an illustrative system 600 suitable for practicing the embodiments of the present disclosure. As illustrated, system 600 includes one or more processors or processor cores 602, and system memory 604. For purposes of this disclosure, including the claims, the terms "processor" and "processor cores" may be considered synonymous, unless the context clearly requires otherwise. Additionally, system 600 includes mass storage devices 606 (such as diskette, hard drive, compact disc read only memory (CDROM) and so forth), input/output devices 608 (such as a display to render visual manifestation, a keyboard, a cursor control, and so forth) and communication interfaces 610 (such as network interface cards, modems and so forth). The elements of FIG. 6 may be coupled to each other via system bus 612, which represents one or more buses. In the case of multiple buses, they may be bridged by one or more bus bridges (not illustrated).

In an embodiment, system memory 604 and mass storage 606 may be employed to store a working copy and a permanent copy of the programming instructions implementing all or a portion of earlier described functions, herein collectively denoted as 622. The instructions 622 may be assembler instructions supported by processor(s) 1302 or instructions that can be compiled from high level languages, such as C or other suitable high level programming languages.

In an embodiment, a permanent copy of the programming instructions is stored into permanent storage 606 in the factory, or in the field, through, for example, a distribution medium (not shown), such as a compact disc (CD), or through communication interface 610 (from a distribution server (not shown)). That is, one or more distribution media having instructions 622 may be employed to distribute the instructions 622 and program various computing devices.

In various embodiments, the system 600 acts as the communication node 204 of FIG. 2. In these embodiments, the system 600 includes or is coupled to one or more transmit antennas and/or receive antennas (e.g., transmit antennas 206a, . . . , 206d, and/or receive antennas 208a and 208b) through which the system 600 communicates with one or more UEs (e.g., UEs 220, . . . , 260). The system 600 receives preferred interference PMIs from the one or more UEs, schedules the UEs for simultaneous transmission based on received preferred interference PM's, and transmits data signals to the UEs based on such scheduling, as previously discussed with respect to, for example, method 500 of FIG. 5.

In various embodiments, the system 600 acts as one of the UEs 220, . . . , 260 (e.g., UE 220) of FIG. 2. In these embodiments, the system 600 includes or is coupled to one or more transmit antennas and/or receive antennas (e.g., transmit antennas 226a, . . . , 226d, and/or receive antenna 228a) through which the system 600 communicates (feeds back preferred interference PMI, receives data signal, etc.) with communication node 204.

In embodiments of the present disclosure, an article of manufacture (not illustrated) implements one or more methods as disclosed herein. For example, in various embodiments, an article of manufacture may comprise a storage medium and a plurality of programming instructions stored in the storage medium and adapted to program a computing device to configure the computing device to feed back preferred interference PMI and SNRs to a communication node (e.g., as discussed with respect to method 400 of FIG. 4) and/or to schedule one or more UEs for simultaneous transmission and transmit data signals to the UEs (e.g., as discussed with respect to method 500 of FIG. 5). In various embodiments, an article of manufacture comprises a storage medium and a plurality of programming instructions stored in the storage medium and adapted to program computing device to configure the computing device to perform one or more operations of the methods 400 and/or 500 of FIGS. 4 and/or 5, respectively.

Although specific embodiments have been illustrated and described herein, a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. This application is intended to cover any adaptations or variations of the embodiment discussed herein. Therefore, it is manifested and intended that the invention be limited only by the claims and the equivalents thereof.

What is claimed is:

1. A method comprising:
    selecting, by a user equipment, a preferred interference precoding matrix from among a plurality of candidate precoding matrices included in a codebook, wherein the preferred interference precoding matrix is associated with a direction such that when a communication node transmits a signal in the direction associated with the preferred interference precoding matrix, an interference power component of the transmitted signal received by the user equipment is low;
    determining, by the user equipment, a plurality of signal directions corresponding to precoding matrices that are different from the direction associated with the preferred interface precoding matrix;
    estimating, by the user equipment, for ones of the plurality of signal directions, a corresponding signal to noise ratio (SNR) for signals transmitted from the communication node to the user equipment in the corresponding signal direction; and
    transmitting, by the user equipment to the communication node, (i) an identification of the preferred interference precoding matrix, and (ii) the estimated SNRs corresponding to ones of the plurality of signal directions.

2. The method of claim 1, wherein determining the plurality of signal directions further comprises:
    determining the plurality of signal directions such that ones of the plurality of signal directions is orthogonal to the direction associated with the preferred interface precoding matrix.

3. The method of claim 1, wherein the user equipment is a first user equipment, wherein transmitting (i) the identification of the preferred interference precoding matrix, and (ii) the estimated SNRs corresponding to ones of the plurality of signal directions further comprises:
    transmitting, by the first user equipment to the communication node,
        (i) the identification of the preferred interference precoding matrix to notify the communication node to transmit signals intended for a second user equipment in the direction associated with the preferred interference precoding matrix, and
        (ii) the estimated SNRs corresponding to ones of the plurality of signal directions to notify the communication node to transmit signals intended for the first user equipment in one of the plurality of signal directions.

4. The method of claim 3, wherein transmitting the estimated SNRs corresponding to ones of the plurality of signal directions further comprises:
  transmitting, by the first user equipment to the communication node, the estimated SNRs corresponding to the ones of the plurality of signal directions to facilitate the communication node to (i) select a first one of the plurality of signal directions, and (ii) transmit signals intended for the first user equipment in the first one of the plurality of signal directions.

5. The method of claim 1, wherein selecting the preferred interference precoding matrix from among the plurality of candidate precoding matrices further comprises:
  estimating a plurality of interference power components such that ones of the plurality of interference power components correspond to a respective candidate precoding matrix of the plurality of candidate precoding matrices, wherein ones of the plurality of candidate precoding matrices have a corresponding direction such that when the communication node transmits a signal in the direction associated with the corresponding interference precoding matrix, the corresponding interference power component of the transmitted signal is received by the user equipment; and
  selecting, from the plurality of candidate precoding matrices, a first candidate precoding matrix as the preferred interference precoding matrix, wherein the first candidate precoding matrix is associated with a relatively low interference power component compared to other ones of the precoding matrices.

6. The method of claim 5, wherein selecting the preferred interference precoding matrix from among the plurality of candidate precoding matrices further comprises:
  selecting, from the plurality of candidate precoding matrices, the first candidate precoding matrix as the preferred interference precoding matrix such that the first candidate precoding matrix is associated with a minimum interference power component among the plurality of interference power components.

7. The method of claim 1, wherein selecting the preferred interference precoding matrix further comprises:
  receiving a pilot signal from the communication node;
  determining a channel matrix based at least in part on the pilot signal, the channel matrix being representative of a wireless channel between the communication node and the user equipment; and
  selecting the preferred interference precoding matrix based at least in part on the channel matrix.

8. The method of claim 1, further comprising:
  receiving a first signal direction from the communication node, the first signal direction corresponding to a direction of a data signal to be transmitted by the communication node to the user equipment.

9. The method of claim 8, further comprising:
  receiving the data signal from the communication node, the data signal including a signal component and an interference component, wherein the signal component is being transmitted in the first signal direction, and wherein the interference power component is being transmitted in the direction associated with the preferred interference precoding matrix; and
  processing the received data signal based at least in part on the preferred interference precoding matrix and the first signal direction.

10. The method of claim 1, wherein transmitting, by the user equipment to the communication node, the identification of the preferred interference precoding matrix further comprises:
  transmitting, by the user equipment to the communication node, a preferred interference precoding matrix index (PMI) corresponding to the preferred interference precoding matrix, the preferred interference precoding matrix index (PMI) identifying the preferred interference precoding matrix.

11. A mobile station comprising:
  a preferred interference precoding matrix index (PMI) selection unit configured to select a preferred interference precoding matrix from among a plurality of candidate precoding matrices included in a codebook, wherein the preferred interference precoding matrix is associated with a direction such that when a communication node transmits a signal in the direction associated with the preferred interference precoding matrix, an interference power component of the transmitted signal received by the mobile station is low;
  a signal to noise determination (SNR) determination unit configured to
    determine a plurality of signal directions corresponding to corresponding precoding matrices, ones of the plurality of signal directions being different from the direction associated with the preferred interface precoding matrix, and
    estimate, for ones of the plurality of signal directions, a corresponding signal to noise ratio (SNR) for signals transmitted from the communication node to the mobile station in the corresponding signal direction; and
  one or more transmit antennas configured to transmit, to the communication node, (i) an identification of the preferred interference precoding matrix, and (ii) the estimated SNRs corresponding to ones of the plurality of signal directions.

12. The mobile station of claim 11, wherein the signal to noise determination (SNR) determination unit is configured to determine the plurality of signal directions such that ones of the plurality of signal directions is orthogonal to the direction associated with the preferred interface precoding matrix.

13. The mobile station of claim 11, wherein the mobile station is a first mobile station, and wherein the one or more transmit antennas is configured to transmit, to the communication node:
  (i) the identification of the preferred interference precoding matrix to notify the communication node to transmit signals intended for a second mobile station in the direction associated with the preferred interference precoding matrix; and
  (ii) the estimated SNRs corresponding to ones of the plurality of signal directions to notify the communication node to transmit signals intended for the first mobile station in one of the plurality of signal directions.

14. The mobile station of claim 13, wherein the one or more transmit antennas is configured to transmit, to the communication node, the estimated SNRs corresponding to ones of the plurality of signal directions to facilitate the communication node to (i) select a first one of the plurality of signal directions, and (ii) transmit signals intended for the first mobile station in the first one of the plurality of signal directions.

15. The mobile station of claim 11, wherein the preferred interference precoding matrix index (PMI) selection unit is configured to select the preferred interference precoding matrix from among the plurality of candidate precoding matrices by:

estimating a plurality of interference power components such that ones of the plurality of interference power components correspond to a respective candidate precoding matrix of the plurality of candidate precoding matrices, wherein ones of the plurality of candidate precoding matrices have a corresponding direction such that when the communication node transmits a signal in the direction associated with the corresponding interference precoding matrix, the corresponding interference power component of the transmitted signal is received by the mobile station; and selecting, from the plurality of candidate precoding matrices, a first candidate precoding matrix as the preferred interference precoding matrix, wherein the first candidate precoding matrix is associated with a relatively low interference power component compared to other ones of the precoding matrices.

16. The mobile station of claim 15, wherein the first candidate precoding matrix is associated with a minimum interference power component among the plurality of interference power components.

17. The mobile station of claim 11, wherein the preferred interference precoding matrix index (PMI) selection unit is configured select the preferred interference precoding matrix by:

receiving a pilot signal from the communication node;

determining a channel matrix based at least in part on the pilot signal, the channel matrix being representative of a wireless channel between the communication node and the mobile station; and selecting the preferred interference precoding matrix based at least in part on the channel matrix.

18. The mobile station of claim 11, wherein the mobile station is further configured to:

receive a first signal direction from the communication node, the first signal direction corresponding to a direction of a data signal to be transmitted by the communication node to the mobile station.

19. The mobile station of claim 18, wherein the mobile station is further configured to:

receive the data signal from the communication node, the data signal including a signal component and an interference component, wherein the signal component is being transmitted in the first signal direction, and wherein the interference power component is being transmitted the direction associated with the preferred interference precoding matrix; and process the received data signal based at least in part on the preferred interference precoding matrix and the first signal direction.

20. The mobile station of claim 11, wherein the communication node is a base station.

* * * * *